March 1, 1960 E. A. LAURING 2,926,722
PROCESS OF LAMINATING FIBER INSULATION BOARD WITH AN
ADHESIVE, PROCESS OF MAKING SAID ADHESIVE, AND
AN ADHESIVE COMPOSITION OBTAINED
Filed June 20, 1958

*INVENTOR.*
EDGAR A. LAURING

United States Patent Office

2,926,722
Patented Mar. 1, 1960

2,926,722

PROCESS OF LAMINATING FIBER INSULATION BOARD WITH AN ADHESIVE, PROCESS OF MAKING SAID ADHESIVE, AND AN ADHESIVE COMPOSITION OBTAINED

Edgar A. Lauring, International Falls, Minn., assignor to Minnesota and Ontario Paper Company, Minneapolis, Minn.

Application June 20, 1958, Serial No. 743,364

9 Claims. (Cl. 154—28)

This invention relates to a method of preparing a novel adhesive and the bonding of cellulose fiberboard with the adhesive. More particular, it refers to foamed adhesive material, the method of preparing said adhesive and its employment for bonding fiberboard together.

It is an object of the invention to produce an improved adhesive for laminating fiberboard, which adhesive is not only relatively inexpensive, but permits fabrication of the laminated fiberboard in less time after laminating has heretofore been possible.

It is generally desirable in the laminating of fiberboard to use the smallest quantity of adhesive, by weight, per unit, not only on the grounds of economy, but also because of less amounts of water introduced into the fiberboard during laminating.

In the laminating of fiber insulating board and the like an adhesive that is economical to make, has good water resistance and is mold and fungi resistant is required.

The most economical foam that can be used is prepared from sulfite waste liquor. This material is obtained from the manufacture of cellulose by the so-called "sulfite process" in which wood or other vegetable material is cooked under pressure with a solution containing sulfurous acid and a base such as lime or magnesia. For example, in the manufacture of paper pulp by the sulfite process, wood chips are heated in the digester with a solution of calcium bisulfite including a certain amount of free sulfurous acid until the noncellulosic constituents of the wood are dissolved. The liquid containing these extracted materials is then drawn off leaving relatively pure cellulose. This liquid is commonly referred to as waste sulfite liquor.

The exact chemical nature of waste sulfite liquor is not completely understood and will vary somewhat depending upon the particular wood as well as the composition of the original sulfite solution used in digesting the pulp. It consists essentially of complex organic derivatives from lignin and includes in addition various gum, acids and inorganic impurities. The waste sulfite liquor as recovered from the digester is a thin amber colored solution containing about 10% to about 13% solids and have a pH generally within the range of about 2 to 3.5.

It has been discovered that waste liquor having a Baumé of about 5° or higher produces very effective foam in which suitable adhesive may be incorporated.

In accordance with this invention into waste sulfite liquor as received from the digester there is stirred about 1% to about 10% of lime, usually about 5%. The amount of lime used is based upon the weight of the sulfite waste liquor. Lime in excess of the amount required to neutralize the acid in the waste liquor should be incorporated. The lime adjusts the pH of the waste sulfite liquor to about 8.5 to about 9.0. Stated in another way, the amount of lime added should be such as to neutralize the acid and begin the precipitation of the ligno sulfonates from the waste sulfate liquor. It is preferred that the lime be added as a 33% slurry, for example, 20 lbs. of water and 10 lbs. of lime will produce satisfactory slurry.

In the drawings:

Figure 1 diagrammatically represents the adhesive foaming and applying apparatus;

Figure 1:
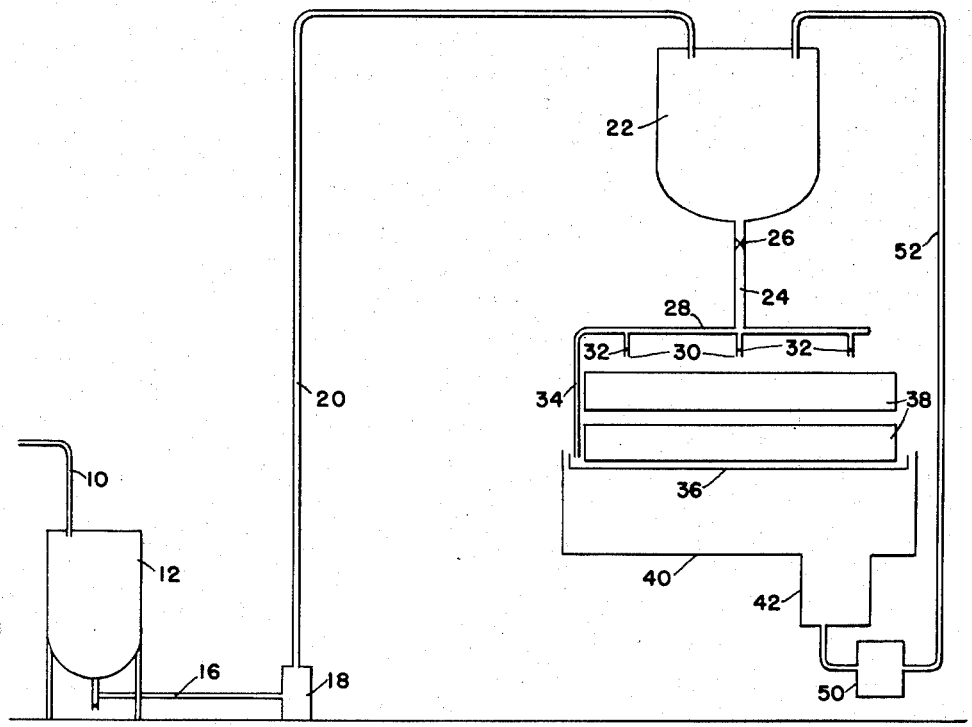

Referring to the drawings in detail, the foaming tank 12 receives waste sulfite liquor and other material through conduit 10. After the adhesive has been prepared, the pump 18 removes the adhesive from tank 12 to conduit 16 and discharges the adhesive through line 20 into circulating tank 22. The adhesive from the circulating tank 22 passes through pipe 24 where the flow is controlled by valve 26. The adhesive from pipe 24 is received by header 28 and a part of the adhesive from the header passes through outlets 30 under the control of valves 32. Part of the adhesive from the header 28 flows through pipe 34 to pan 36 from where the adhesive is picked up by adhesive applying roll. Rotatably mounted on suitable bearings are adhesive applying rolls 38. It is to be understood that the adhesive applying rolls 38 may be of any desired type and arrangement. An excess of adhesive should be applied to the fiberboard and the excess from the fiberboard flows into container 40 and thence into sump 42. The adhesive should be maintained one or two inches above the top of the sump 42 so that air is not drawn into the adhesive. The addition of air at this point would result in the collapse of the bubbles or foam in the adhesive. A suitable float mounted in the sump and operatably connected to the pump 50 will prevent the adhesive from getting too low in the sump and the incorporation of air at this point. The adhesive from the sump 42 is pumped through pipe 52 back to the circulating tank 22.

Figure 2:
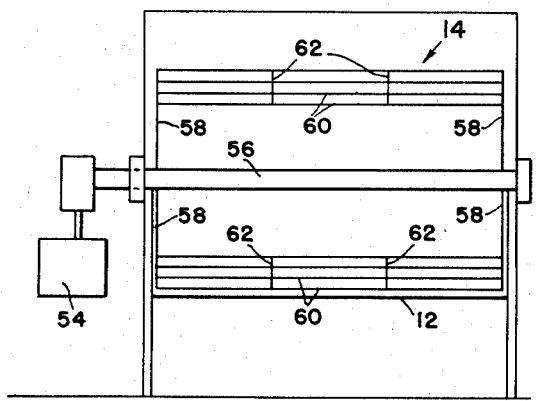
Figure 2 is a side view in section of the foaming apparatus.
Figure 3:
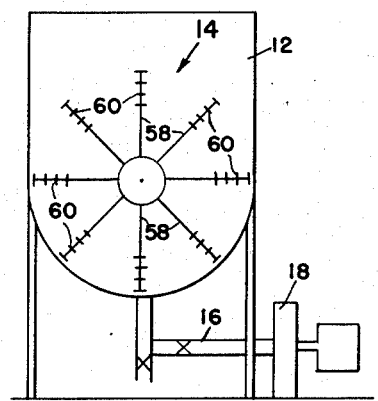
Figure 3 is an end view in section of the foaming apparatus.

In Figure 2 the agitator 14 is driven through a suitable variable speed driving 54. The drive may be variable speed of 30–120 r.p.m. Mounted on the rotatable shaft 56 are arms 58 which support a series of blades 60. These blades, for example, should be about one inch in width and about $1/16$ of an inch in thickness. Any suitable number of blades may be used, for example, thirty such blades give excellent results in producing foam in a tank about 60 inches long and about 37 inches wide. It is desirable that the blades be supported in their space relationship by suitable spacers 62. By way of example, undiluted sulfite waste liquor of 5° Baumé is added to the foam tank 12. The agitator 14 is set to rotate at a low speed, for example, 30 r.p.m. About 5% of lime is mixed with the waste sulfite liquor, the lime being added at a 33% water slurry. After the lime has been incorporated, the rate of agitation to incorporate air is increased to about 75 r.p.m. The agitation is continued at this speed until the density of the foam reaches about 160 to 170 gr./1,000 cc. Stated in another way, the agitation should continue until the waste sulfite liquor is foamed and has increased in volume about six times and has a specific gravity of about .160 and is composed of very fine bubbles.

It has been indicated that raw waste sulfite liquor as received from the digester having approximately 10% of solids is preferred, but it is to be understood that concentrated or dried form of waste sulfite liquor that is redissolved may be utilized. Generally, the concentration or evaporation results in a very dark color which in many uses may be undesirable.

To the foamed material a prepared glue may be added, but in some instances the materials going into making up the glue can be added separately. It is preferred that a glue containing a suitable binder such as starch, proteins or a combination of the two, together with a resin that gives good water resistance and has good mold and fungi resistance be combined and this prepared material in a predetermined amount be added to the foam.

A resin that provides the best water resistance as well as excellent mold and fungi resistance is resorcinol-formaldehyde resin. A phenol-formaldehyde resin gives very good water resistance, but lower mold and fungi resistance. For an example, an urea-formaldehyde resin will not provide the mold and fungi resistant adhesive. The amount of resin used may vary within the range of about 2.5% to about 6% based upon the weight of the binder, less than about 2.5% will not provide the water resistance or the mold and fungi resistance required. The formaldehyde is based upon about 10% to about 12% of the weight of the resorcinol used.

Binders, as used in the specifications and the claims, is intended to mean starches, proteins and the like, or a combination of such materials. The binder is used generally within the range of about 150 pounds to 250 pounds.

Wetting agents as used throughout this specification and claims is intended to be a material which modifies the surface tension of the liquid and promotes quicker and better wetting of the binder. Suitable wetting agents may be sulphonates of organic compounds, soap of amines, soaps and other materials.

The following may be prepared for addition to the foamed material:

|  | Parts |
| --- | --- |
| Water | 1,000 |
| Binder | 200 |
| Wetting agent | 1 |
| Resin | 6 |

The foamed waste liquor when prepared as above indicated will adhere to the face of a spatula blade held in a perpendicular position. Drainage from such foam material is less than 1 cc. in four hours from a 1,000 cc. of foam in 1½" diameter 500 cc. graduated cylinder. To this foam is added the material containing the binder and resin. The amount of this material added is about in equal volume to that of the volume of foam. Stated in another way, sufficient binder-resin combination is added to adjust the specific gravity of the foamed adhesive to about 0.55. The agitation of the foam should be reduced (to about 30 r.p.m.) below that at which the foam was produced. When the foamed adhesive has reached the proper density it is pumped to the circulating tank above the adhesive applying machine. From the tank it flows by gravity to the adhesive spreading rolls.

Other foaming agents can be used, but the cost of preparing foam increases. For example, a 1% solution of saponin may be used, but the time and cost is considerably above that where sulfite waste liquor is employed. Whatever foaming agent used, the density should be substantially that shown for waste sulfite liquor.

More adhesive is applied than is required for securing the fiberboard together. The surplus is returned to the circulating tank 22. After the adhesive is applied to the fiberboard a time of not substantially greater than five minutes should elapse before laminating takes place. A pressure of about 50 pounds per square inch should be applied for not less than about seven minutes.

What is claimed:

1. A fungi resistant adhesive of foamed limed waste sulphite liquor of about 10% to about 13% solids having distributed there through an aqueous slurry in a volume substantially equal to the foamed liquor; said slurry containing a starch binder and a resorcinol-aldehyde resin in which the aldehyde is 10 to about 12% based upon the weight of the resorcinol, said resin present in an amount of about 6% based upon weight of the binder and the foamed liquor and slurry have a specific gravity of about 0.55.

2. An adhesive of foamed limed waste sulphite liquor of about 10% to about 13% solids having distributed there through an aqueous slurry in a volume substantially equal to the foamed liquor; said slurry containing a starch binder and a resorcinol-aldehyde resin, in which the aldehyde is 10 to about 12% based upon the weight of the resorcinol, said resin present in an amount of about 2.5% to about 6% based upon the weight of the binder and the foamed liquor and slurry having a specific gravity of about 0.55.

3. A water, mold and fungi resistant adhesive of foamed limed waste sulphite liquor of about 10% to about 13% solids having distributed there through an aqueous slurry in a volume substantially equal to the foamed liquor, said slurry comprising a starch binder of about 150 parts to about 200 parts and a resorcinol-formaldehyde resin in which the formaldehyde is about 10 to about 12% based upon the weight of the resorcinol, said resin present in an amount of about 2.5% to about 6% based on weight of the binder and the foamed liquor and slurry having specific gravity of about 0.55.

4. A method of making a foamed adhesive comprising stirring lime into a raw waste sulphite liquor having a solid content of about 10% to about 13% as received from a digester to adjust the pH to about 8.5 to about 9.0, agitating to foam the limed sulphite liquor until a specific gravity of about 0.160 to about 0.170 is obtained, incorporating into the said foamed sulphite liquor a slurry in about equal volume, said slurry containing starch in an amount of about 150 to about 250 parts, about 2.5% to about 6% of resorcinol-formaldehyde resin based upon the weight of the starch, said resin containing about 10 to about 12% of formaldehyde based upon the weight of the resorcinol and then agitating the materials until a specific gravity of about 0.55 is obtained.

5. The process of making a foamed adhesive comprising foaming limed waste sulphite liquor having a solid content of about 10% to about 13% until the volume thereof increases about six times and has a specific gravity of about 0.160 and a pH of about 8.5 to about 9.0, said waste sulphite liquor having before the addition of lime, a pH of 2.0 to about 3.5%; incorporating an aqueous slurry in volume about equal to the volume of the foamed liquor, said slurry containing starch and resorcinol-formaldehyde resin in which there is about 10% to about 12% formaldehyde based upon the weight of the resorcinol and then agitating the mixture until the specific gravity of 0.55 is obtained.

6. A method of making a water, mold and fungi resistant foamed adhesive comprising stirring into raw waste sulphite liquor containing about 10% to about 13% solids, and having a pH of about 2 to about 3.5, lime in excess of the amount required to neutralize the acid in the waste sulphite liquor; agitating the limed sulphite to incorporate air therein until the liquor volume increases about six times and has specific gravity of about 0.160 to about 0.170; adding to the foamed liquor about an equal volume of the slurry containing about 150 to 200 parts of a binder including starch and a resorcinol-formaldehyde resin containing about 10 to about 12% formaldehyde on the weight of the resorcinol, said resin present in the amount of about 2.5% to about 6% based on the weight of the binder and then stirring the mixture until this specific gravity reaches 0.55.

7. The method of making a water, mold and fungi resistant foamed adhesive comprised of mixing in sulphite waste liquor containing about 10% to about 13% solids, and a pH of about 2 to about 3.5, lime in excess of the amount required to neutralize the acid in the waste sulphite liquor; agitating the limed sulphite liquor to incorporate air therein until the liquor volume increases about six times and has a specific gravity of about 0.160 to about 0.170; adding to the foamed liquor about an equal volume of a slurry, said slurry containing about 1,000 parts of water, 200 parts of binder of starch and 6 parts of resorcinol-formaldehyde resin containing about 10 to about 12% of formaldehyde based on the weight of the resorcinol and then stirring the mixture until a specific gravity of about 0.55 is reached.

8. A process of laminating fiber insulation board comprising coating at least one surface of each fiber insulation board with an adhesive in the form of foam of about 10% to about 13% solids and containing substantially equal volume of foam and a slurry, containing starch and a resorcinol-formaldehyde, said formaldehyde present in the amount of about 10 to about 13% based upon the weight of the resorcinol, curing the adhesive applied to the board for a time, not substantially greater than about five minutes and then cementing the boards together by pressure of about 50 pounds per square inch for a time not less than seven minutes.

9. The method of making a water, mold and fungi resistant foamed adhesive comprising stirring into raw waste sulphite liquor containing about 10% to about 13% solids as received from a digester, lime in excess of the amount required to neutralize the acid in the raw waste sulphite liquor; materially increasing the speed of agitation of the said limed liquor to incorporate air therein until the volume increases about 6 times and has a specific gravity of about 0.160 to about 0.170; then stirring into the foamed liquor at a speed below that at which the air was incorporated, a slurry in about an equal volume, said slurry containing about 150 parts to about 250 parts of starch and about 2.5% to about 6% of resorcinol-formaldehyde resin the formaldehyde being present in an amount of about 10% to about 12% based upon the weight of the resorcinol, and containing the stirring until a density of about 0.55 is obtained.

References Cited in the file of this patent

UNITED STATES PATENTS

| | | |
|---|---|---|
| 1,898,522 | Bock | Feb. 21, 1933 |
| 2,099,717 | Alles | Nov. 23, 1937 |
| 2,323,831 | Menger et al. | July 6, 1943 |
| 2,384,387 | Meyer | Sept. 4, 1945 |